(12) United States Patent
Fujita et al.

(10) Patent No.: US 8,010,999 B2
(45) Date of Patent: Aug. 30, 2011

(54) CABLE INSTALLATION SUPPORT AND MANAGEMENT SYSTEM

(75) Inventors: Hirotaka Fujita, Tokyo (JP); Sozo Sakata, Tokyo (JP); Kou Fukui, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 902 days.

(21) Appl. No.: 11/968,516

(22) Filed: Jan. 2, 2008

(65) Prior Publication Data
US 2008/0172722 A1    Jul. 17, 2008

(30) Foreign Application Priority Data

Jan. 11, 2007  (JP) .................. 2007-003527

(51) Int. Cl.
*H04L 9/32* (2006.01)
*H04L 9/00* (2006.01)
*G06F 7/04* (2006.01)

(52) U.S. Cl. .............. 726/4; 726/5; 726/6; 713/169; 713/170; 713/171; 713/172

(58) Field of Classification Search .............. 726/4
See application file for complete search history.

(56) References Cited

U.S. PATENT DOCUMENTS

| 6,748,340 B2 * | 6/2004 | Otsuki et al. ............ 702/150 |
| 6,808,116 B1 * | 10/2004 | Eslambolchi et al. ........ 235/492 |
| 2003/0061110 A1 * | 3/2003 | Bodin ..................... 705/26 |
| 2007/0120684 A1 | 5/2007 | Utaka et al. |

FOREIGN PATENT DOCUMENTS

| JP | 5-161224 A | 6/1993 |
| JP | 2003-281196 A | 10/2003 |
| JP | 2004-252851 A | 9/2004 |
| JP | 2005-204412 A | 7/2005 |
| JP | 2005-286687 A | 10/2005 |
| JP | 2006-271154 A | 10/2006 |
| JP | 2007-140886 A | 6/2007 |
| JP | 2008-59116 A | 3/2008 |

OTHER PUBLICATIONS

Japanese Office Action, Patent Application No. JP2007-003527, Dated Feb. 17, 2011, English Translation of Japanese Office Action.

* cited by examiner

*Primary Examiner* — Longbit Chai
(74) *Attorney, Agent, or Firm* — Roberts Mlotkowski Safran & Cole, P.C.; David S. Safran

(57) ABSTRACT

According to a cable installation support and management system of the present invention, each worker downloads the operation information which supports operations on cables authorized for use onto the portable terminal carried by the worker, the operation information being associated in advance with cable identification information and provided by the server. Then, the worker reads the cable identification information about a cable from the cabling data card attached to the end of the cable using the reading device of the portable terminal. Based on the cable identification information, the worker acquires operation information about the appropriate cable from the downloaded operation information and displays the acquired operation information on the display device of the portable terminal. This allows the worker to perform necessary operations by referring to the operation information displayed on the display device.

18 Claims, 15 Drawing Sheets

FIG.2
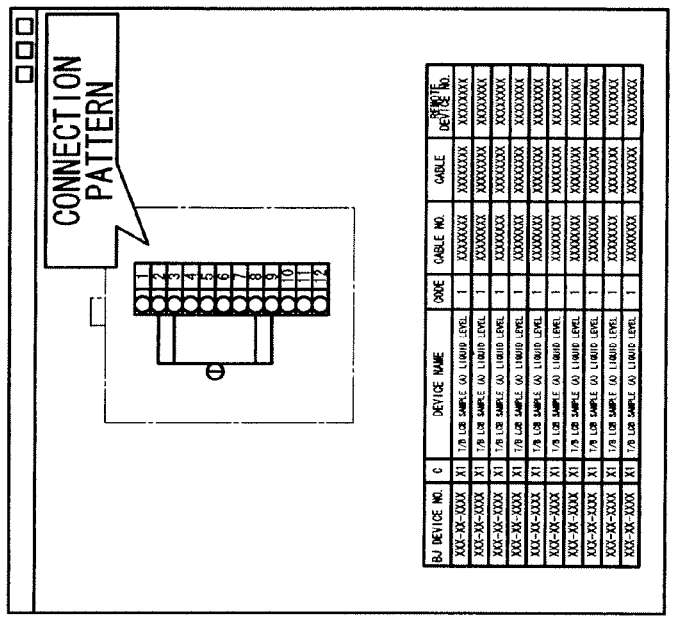
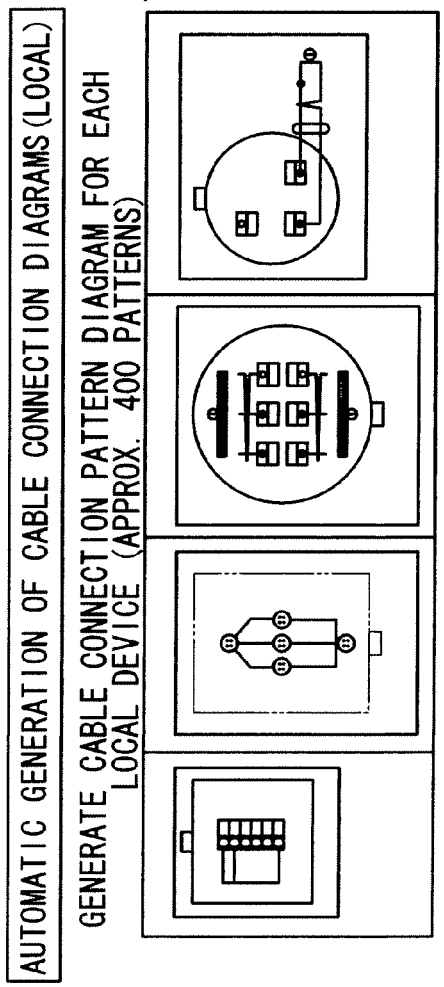

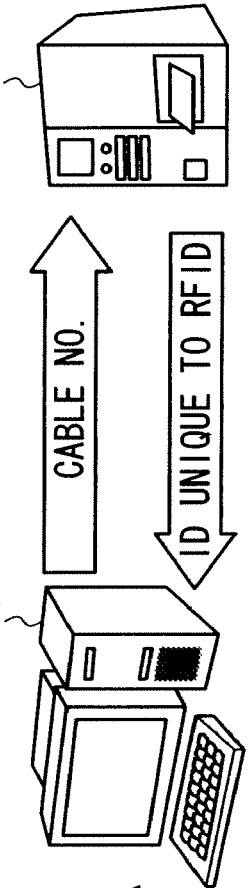
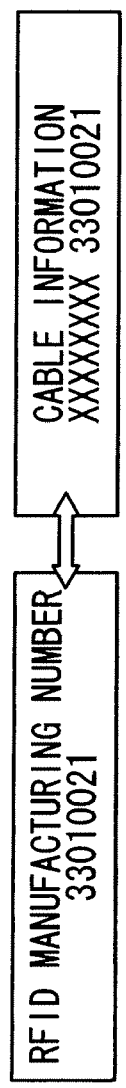
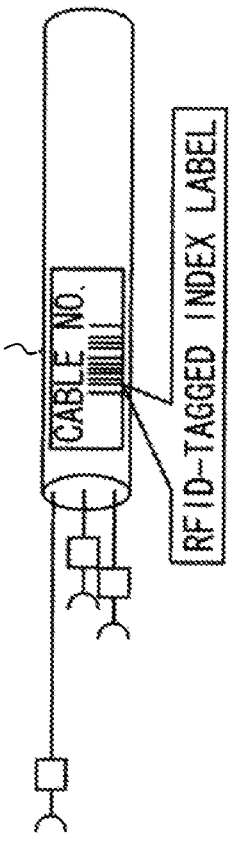
FIG.5A ASSOCIATING RFID MANUFACTURING NUMBER WITH CABLE INFORMATION
LINK CABLE NO. AND CORE COUNT TO RFID MANUFACTURING NUMBER BY READING THEM WITH READER
CABLE NO.
ID UNIQUE TO RFID
RFID MANUFACTURING NUMBER 33010021 ↔ CABLE INFORMATION XXXXXXX 33010021
LINKAGE
FIG.5B RFID-TAGGED INDEX LABEL ATTACHMENT

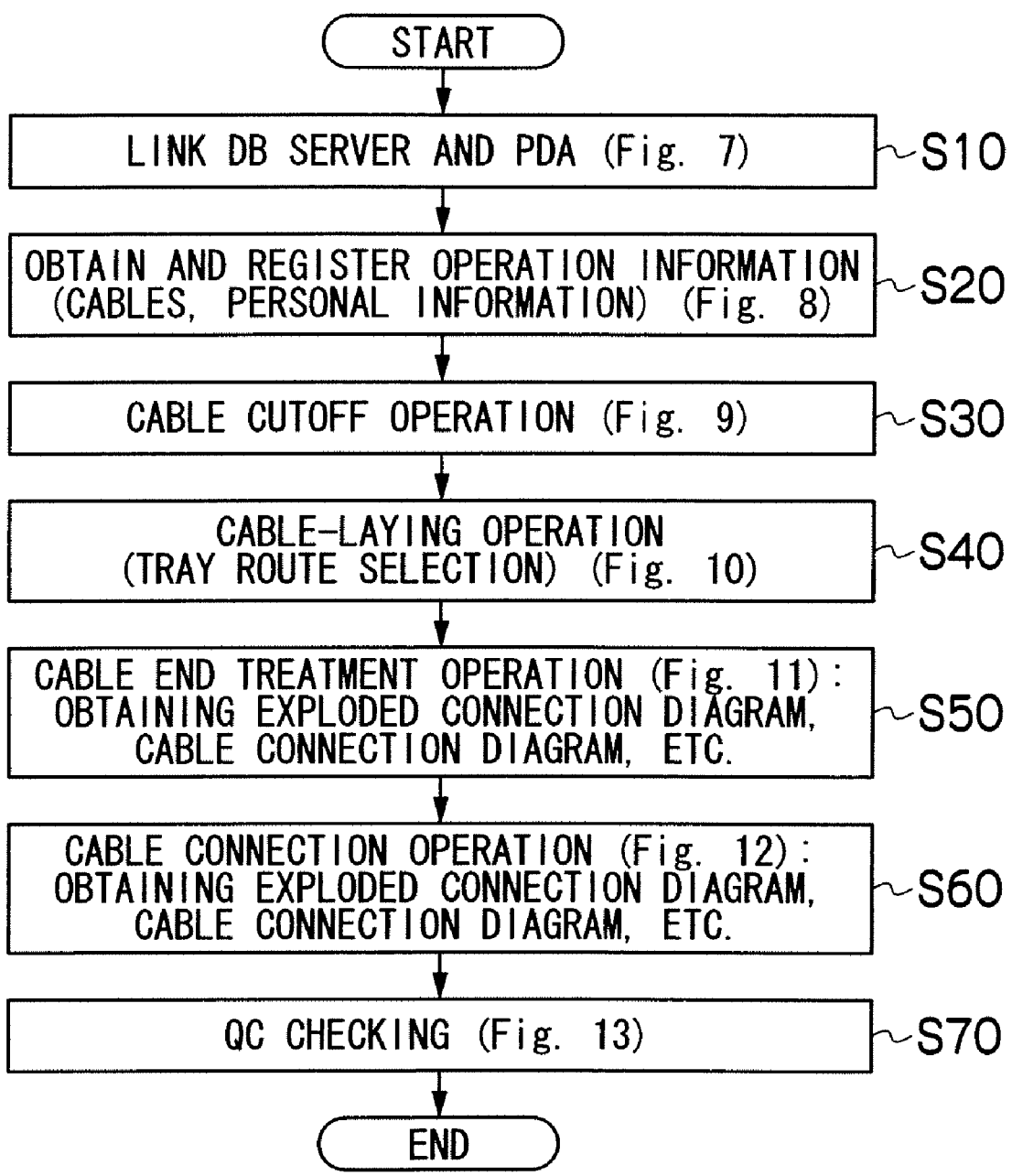

OBTAINING AND REGISTERING OPERATION INFORMATION
(CABLES, PERSONAL INFORMATION)

· PRELIMINARY SETTINGS
 (COMMON TO CABLE CUTOFF, LAYING,
 AND END TREATMENT OPERATIONS)
· PERSONAL ID AUTHENTICATION
· IDENTIFICATION OF CABLE NO. BY CABLE ID

FIG.9A

Cutoff Operation　Worker:XXXXX　👤 💬 14:49

INPUT FIELDS
- Drum No.　XXXXX ▽
- Length　145 m
- Length marks　S 215　E 70
- Cutoff date:　Oct. 11, 2006 ▽
- [Register] [Cancel]

CABLE INFORMATION
- Cable No.:　XXXXX
- Design length　145
- Wire type　XXXX
- Core count　7P　Size:1.30
- Spec. code　XXXXXX

Cutoff Operation　Worker:XXXXX　👤 💬 14:50

- Drum No.　XXXXX ▽
- Length　145 m
- Length marks　S 215　E 70
- Cutoff date:　Oct. 11, 2006 ▽
- [Register] [Cancel]

Cable No.:　XXXXX

Character input interface

⧉ 14:49  Worker:XXXXX
Laying Operation

Cable No.      XXXXX
Design length  145
Wire type      XXXX
Core count     7P   Size:1.30
Spec. code     XXXXXX
Laying date:   Oct. 11, 2006 ▽

[Register] [Cancel]

File (F) Edit (E) View (V)
⇐Back▽⇨ ⊗ ▢ ⌂

| CA% | | [Search] |

GA012T02           A              S
C91-P022-02    R1FW1
B21-TE-041B    R1F14
HT-17(TX)         1P          1.3
159
ABCDEF01  ABCDEF11  ABCDEF21  ABCDEF31
BCDEFG02  BCDEFG12  BCDEFG22  BCDEFG32
CDRFGH03  CDRFGH13  CDRFGH23  CDRFGH33
DEFGHI04  DEFGHI14  DEFGHI24  DEFGHI34
EFGHIJ05  EFGHIJ15  EFGHIJ25  EFGHIJ35
162

[↓] [↑]

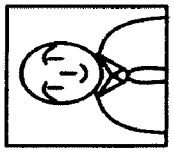

CABLE INSTALLATION SUPPORT AND MANAGEMENT SYSTEM

BACKGROUND OF THE INVENTION

1. Field of the Invention

The present invention relates to a cable installation support and management system, and more particularly, to a technique for supporting and managing installation work of electrical cables in large plant facilities and the like.

2. Description of the Related Art

FIG. 14 is a diagram showing a conventional flow of cable design installation support and management. As shown in the figure, in an electrical wiring design section, necessary information is gathered together for each cable based on upstream design information (Step A). A cable length is determined by selecting a laying route (point numbers of cable trays (cable racks) containing a cable to be laid) (Step B). Also, a cable size and type are selected (Step C). Processes of Steps A, B, and C are performed for each cable number (Step D).

In Step E, information about cable sizes, types, lengths, and core counts, start and end point names, and laying routes (point numbers of cable trays, numbers of conduit tubes passed, and the like) gets ready and is tabulated in a wiring chart. Based on the wiring chart, a card for use to deliver instructions and information concerning a laying operation is printed for each cable. The card is referred to as a cabling data card.

As shown in FIG. 15, the cabling data card is divided along a perforated tear-off line into a portion (stub X) in which all the information is printed and a portion (stub Y) to be attached to both ends of a cable to be laid. Stub Y is used as a guide in cable-laying and cable end connection.

Also, cables are prepared based on the wiring chart (Step F).

In an on-site installation and installation management section, a desired cable is cut off from a cable drum based on the information recorded on the cabling data card (Step K). Stub Y torn off from stub X is pasted to both ends of the cut cable (Step L).

The cable with stub Y is laid along the laying route printed on stub X (Step M). A cabling check list is printed on the back of stub X and used for checking after the laying operation.

Next, the cable ends are treated (stripping and terminal mounting) (Step N) and the cable is connected to a panel and terminal board (Step O).

Connecting position information needed for operations in Steps N and O in connecting the cable to equipment and the electrical panel is obtained from a connection diagram created based on a sequence diagram and the worker performs a connection operation by referring to the connection diagram. After the connection operation, the worker confirms that connecting positions agree with the drawing and puts a check mark in a recording sheet (Step P).

A manager checks connected wires against the connection diagram, and signs the recording sheet if it is confirmed that the operation has been performed properly.

Conventionally, there has been proposed a cabling management system which labels cables with barcodes containing data (such as cable names, standards, size and total length) needed for management of cable-laying operations, reads the barcodes using a barcode reader, and inputs the data in an information processing unit (Japanese Patent Application Laid-open No. 5-161224).

SUMMARY OF THE INVENTION

The conventional cable design and installation management system shown in FIG. 14 has the following drawbacks: The system uses the connection diagram and recording sheet and cannot check soundness of operations using one of them alone. Also, since both connection diagram and recording sheet are made of paper, it is difficult to convert data into electronic form when building an operation traceability system (with a system which scans paper, it is not possible to perform searches using paper-based information).

Also, the system has the following drawbacks: Since the operation of removing or restoring wires for testing is managed using a recording sheet different from the one used by the worker who has made connections initially, there is always a time lag before the latest state of connections can be learned. Besides, the use of different recording sheets causes an operation record to lose its value in terms of consistency.

Furthermore, the system has the following drawbacks: when using conditions of cable-laying, cable end treatment, and connection operations in-process for progress management or budget management or when checking remaining material after cables are cut off or checking inventory, since information is scattered in various process locations, time lags always tend to cause errors.

On the other hand, although Japanese Patent Application Laid-open No. 5-161224 discusses how to input required data in an information processing unit without human error by reading the barcodes (data needed for management of cable-laying operations) labeled on the cables and how to examine and manage cable-laying operations based on the inputted data, but does not discuss how to support cable-laying operations on site or how to manage the latest state of connections.

The present invention has been made in view of the above circumstances and has an object to provide a cable installation support and management system which makes it possible to support cable-laying operations of workers in the field from a design department, achieve labor savings and speedup in operations and checkups by using electronic format when verifying and recording completion of operations, and improve reliability (ensure traceability) of information exchange in relation to authentication of workers, permission of operations, reporting of operation results, reporting of check results, and the like.

To achieve the above object, according to a first aspect of the present invention, there is provided a cable installation support and management system which comprises a portable terminal carried by a worker and a server which exchanges necessary information with the portable terminal via a network, the cable installation support and management system being used when laying a cable along a predetermined route in a facility, where a cabling data card containing cable identification information unique to the cable is attached to an end of the cable, and when connecting the end of the cable to a panel and a terminal board to which the cable is connected, wherein: the portable terminal comprises: a reading device which reads the cable identification information out of the cabling data card attached to the end of the cable, a first storage device which downloads and stores operation information which, being associated in advance with cable identification information and provided by the server, supports operations on cables authorized for use, an operation information acquiring device which acquires, from the first storage device based on the cable identification information read by the reading device, operation information about the cable corresponding to the cable identification information, and a display device which displays the operation information acquired by the operation information acquiring device; and the server comprises: a second storage device which stores operation information which supports operations on cables to be laid in the facility by associating the operation information with the cable identification information about the cables, an extraction device which extracts operation information about a cable authorized and available for use from the second storage device in response to a download request from the portable terminal, and an operation information providing device which provides the operation information extracted by the extraction device to the portable terminal together with the cable identification information.

That is, each worker downloads the operation information which supports operations on cables authorized for use onto the portable terminal carried by the worker, the operation information being associated in advance with cable identification information and provided by the server. Then, the worker reads the cable identification information about a cable from the cabling data card attached to the end of the cable using the reading device of the portable terminal. Based on the cable identification information, the worker acquires operation information about the appropriate cable from the downloaded operation information and displays the acquired operation information on the display device of the portable terminal. This allows the worker to perform necessary operations by referring to the operation information displayed on the display device.

According to a second aspect of the present invention, there is provided a cable installation support and management system which comprises a portable terminal carried by a worker and a server which exchanges necessary information with the portable terminal via a network, the cable installation support and management system being used when laying a cable along a predetermined route in a facility and when connecting the end of the cable to a panel and a terminal board to which the cable is connected, where a cabling data card containing cable identification information unique to the cable is attached to an end of the cable, wherein: the portable terminal comprises: a reading device which reads the cable identification information out of the cabling data card attached to the cable, an operation information acquiring device which acquires, from the server based on the cable identification information read by the reading device, operation information which supports operations on the cable corresponding to the cable identification information, and a display device which displays the operation information acquired by the operation information acquiring device; and the server comprises: a second storage device which stores operation information which supports operations on cables to be laid in the facility by associating the operation information with the cable identification information about the cables, an extraction device which extracts, from the second storage device based on the cable identification information received from the portable terminal, operation information corresponding to the cable identification information, and an operation information providing device which provides the operation information extracted by the extraction device to the portable terminal.

According to the first aspect of the present invention, operation information which supports operations on cables authorized for use is downloaded from the server at the beginning, but according to the second aspect of the present invention, cable identification information is read out of the cabling data card attached to the cable using the reading device of the portable terminal and the operation information about the cable is acquired from the server based on the cable identification information read out, so the second aspect is different from the first aspect of the present invention.

According to a third aspect of the present invention, in the cable installation support and management system according to the first or second aspect, the cabling data card is attached to each of opposite ends of the cable, where the cabling data cards attached to the opposite ends contain different cable identification information. Opposite ends of a cable are often connected to different types of panels or terminal boards and operation information about connections can be obtained for each of the cable ends.

According to a fourth aspect of the present invention, in the cable installation support and management system according to any of the first to third aspects, an RFID tag is embedded in the cabling data card or a barcode is printed on the cabling data card; and the reading device of the portable terminal is a RFID tag reader or a barcode reader.

According to a fifth aspect of the present invention, in the cable installation support and management system according to any of the first to fourth aspects, the portable terminal further comprises an input device for use by the worker to enter authentication information in order to obtain access permission to at least the server. This makes it possible to prevent unauthorized access and provide only the operation information needed by the accessing worker according to access privileges of the worker.

According to a sixth aspect of the present invention, in the cable installation support and management system according to the fifth aspect, the authentication information about the worker is recorded in an RFID tag embedded in an authentication card of the given worker, and the input device is a RFID tag reader.

According to a seventh aspect of the present invention, in the cable installation support and management system according to the fifth or sixth aspect, the portable terminal comprises a registration device used to register an end of operation corresponding to the operation information, and uploads the cable identification information, a registration date/time, and the authentication information about the worker to the server when the end of operation is registered via the registration device or when an upload command is entered. This makes it possible to easily maintain an operations history as to what operation was finished, by what worker, when, and so on.

According to an eighth aspect of the present invention, in the cable installation support and management system according to any of the first to seventh aspects, the operation information includes information about at least one of a cable cutoff operation of cutting off a cable of designed length from a cable drum, a cable-laying operation of laying the cut cable along a designed route, cable end treatment operation of treating cable ends at both ends of the laid cable to make the cable ends connectable, a cable connection operation of connecting the treated cable ends to the panel and the terminal board, and a checking operation of checking the connected cable.

According to a ninth aspect of the present invention, in the cable installation support and management system according to the eighth aspect, the operation information about the cable cutoff operation includes information for identification of the cable and information about design length of the cable.

According to a tenth aspect of the present invention, in the cable installation support and management system according to the eighth or ninth aspect, the operation information about the cable-laying operation includes route information for laying the cable. The route information for laying the cable is represented, for example, by point numbers of cable trays (cable racks).

According to an eleventh aspect of the present invention, in the cable installation support and management system according to any of the eighth to tenth aspects, the operation information about the cable end treatment operation, the cable connection operation, and the checking operation includes a cable connection diagram.

According to a twelfth aspect of the present invention, in the cable installation support and management system according to the eleventh aspect, the operation information about the checking operation includes a check list.

The present invention makes it possible to acquire operation information about a cable and display the operation information on the portable terminal by reading cable identification information out of the cabling data card attached to the end of the cable using the portable terminal of the worker. This allows the worker to perform necessary operations by referring to the displayed operation information.

Also, as the authentication information about the worker is entered in the portable terminal and the end of operation is registered, the server can maintain operations history easily.

BRIEF DESCRIPTION OF THE DRAWINGS

FIG. 2 is a diagram illustrating automatic generation of cable connection diagrams;

FIGS. 5A and 5B are diagrams illustrating how a manufacturing number of a RFID tag embedded in a RFID-tagged index label is associated with cable information;

FIG. 6 is a flowchart showing a flow of operations carried out with the cable installation support and management system according to the present invention

FIGS. 9A and 9B are diagrams showing a Cable Cutoff Operation screen displayed on the PDA FIGS. 10A and 10B are diagrams showing a Cable-laying Operation screen displayed on the PDA;

FIGS. 11A and 11B are diagrams showing a PDA screen used to obtain operation information for a cable end treatment operation (obtaining exploded connection diagram of connection operation (upstream data), cable connection diagram, etc.);

DETAILED DESCRIPTION OF THE PREFERRED EMBODIMENTS

A cable installation support and management system according to a preferred embodiment of the present invention will be described with reference to the attached drawings.
<Schematic System Configuration>

Figure 1:
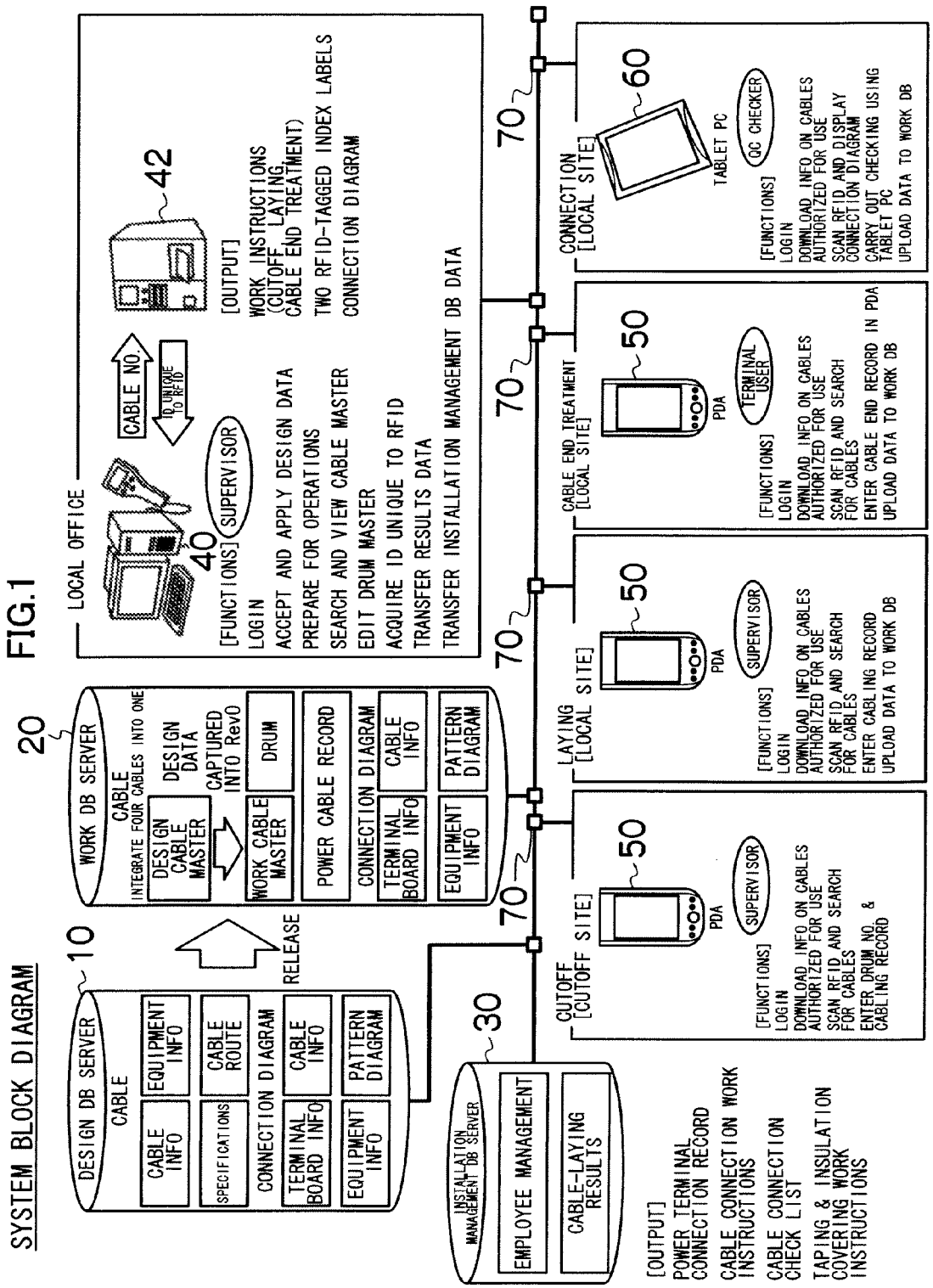
FIG. 1 is an overall block diagram of a cable installation support and management system according to the present invention.

FIG. 1 is an overall block diagram of a cable installation support and management system according to the present invention.

The cable installation support and management system mainly comprises a design database server (DB server) 10 installed in a company office of a business engaged in cable installation, work DB server 20, installation management DB server 30, personal computer 40 installed in a local office of a large plant facility such as a nuclear power plant, printer 42, a portable terminal (PDA (personal digital assistant) 50 and tablet PC 60) carried by each worker in various sites, and a network which connects them.

The design DB server 10, work DB server 20, installation management DB server 30, and personal computer 40 in the local office are connected with one another via private lines. Also, the PDA 50 and tablet PC 60 incorporate wireless LAN communications capabilities and can communicate with the DB servers connected to the private lines via a wireless access point 70 installed on each floor of a housing or in each predetermined area.

The design DB server 10 manages information about cables (cable information, equipment information, specifications, cable routes), information about cable connections (terminal board information, cable information, equipment information, pattern diagrams), and the like. Information about construction work permitted by a design department is passed to the work DB server 20.

A personal computer installed in the design department (not shown) stores a program for automatic generation of cable connection diagrams. As shown in FIG. 2, the personal computer automatically generates the cable connection diagrams in ECWD (elementary control wiring diagrams) format and the like based on pattern diagrams and cable information about each local device.

Figure 3:
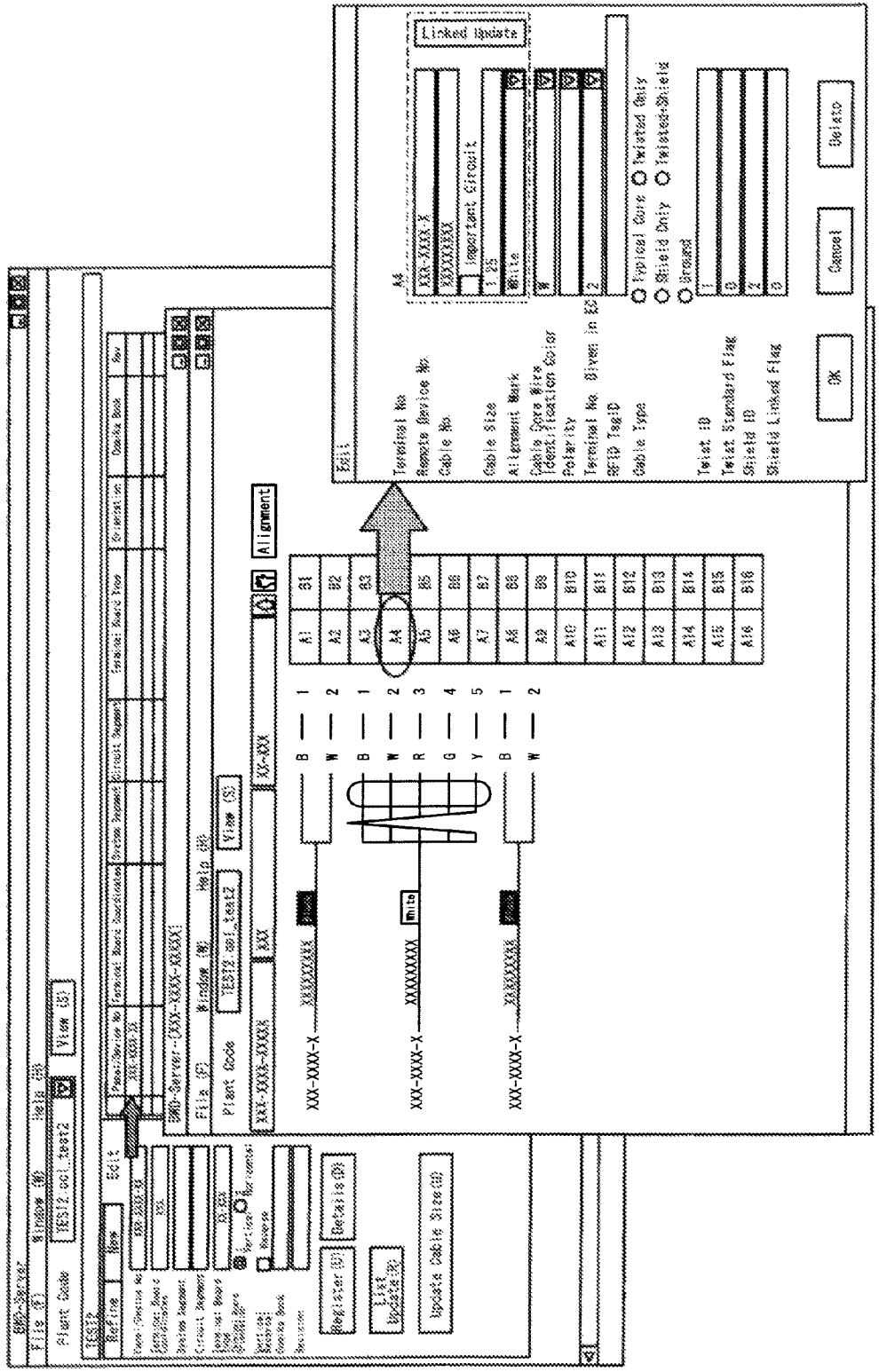
FIG. 3 is a diagram illustrating edition of automatically generated cable connection diagrams.

Also, as shown in FIG. 3, the personal computer has a function to edit the cable connection diagrams generated automatically as above. The design DB server 10 also manages information about the cable connection diagrams.

The installation management DB server 30 manages personal information about employees (workers) based on authentication information about the employees (hereinafter referred to as "user IDs") as well as manages results data of cable installation.

The personal computer 40 in the local office outputs cable number print information to the printer 42 and makes the printer 42 print cable numbers on cabling data cards. Incidentally, a RFID (radio frequency identification) tag has been embedded in each cabling data card and the RFID tag embedded in the cabling data card contains unique cable identification information (cable ID) which corresponds one-to-one with the cable number.

The personal computer 40 receives, from the printer 42, the cable ID read out by the printer 42 or reads the cable ID from the cabling data card outputted by the printer 42, associates the cable ID with the cable number, and transmits the association information to the work DB server 20. The work DB server 20 links the cable number/cable ID association information received from the personal computer 40 to operation information in each site, where the operation information is managed for each cable number.

The PDA 50 and tablet PC 60 include a storage device, display device such as a liquid crystal display, and input device such as a touch panel, where the storage device stores an operating system (OS) which makes the PDA 50 and tablet PC 60 to operate as terminals, device drivers for peripheral devices, and software of the cable installation support and management system according to the present invention. Also, a RFID reader for use to read cable IDs from RFID tags has been mounted in a connector or slot of the PDA 50 and tablet PC 60.

<Flow of Cable Design, Installation, and Management According to the Present Invention>

Figure 4:
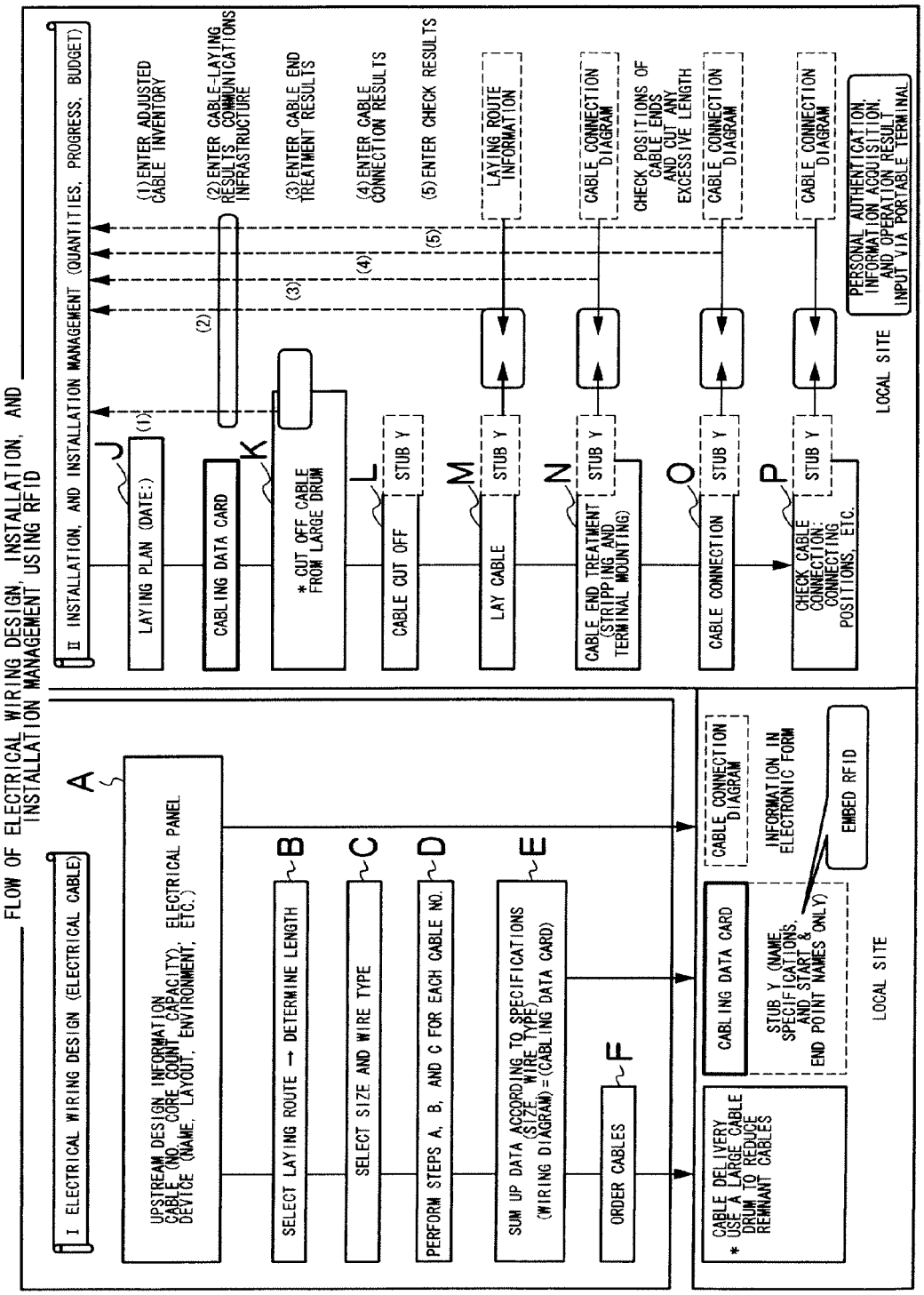
FIG. 4 is a diagram showing a flow of cable design, installation, and management according to the present invention.
Figure 14:
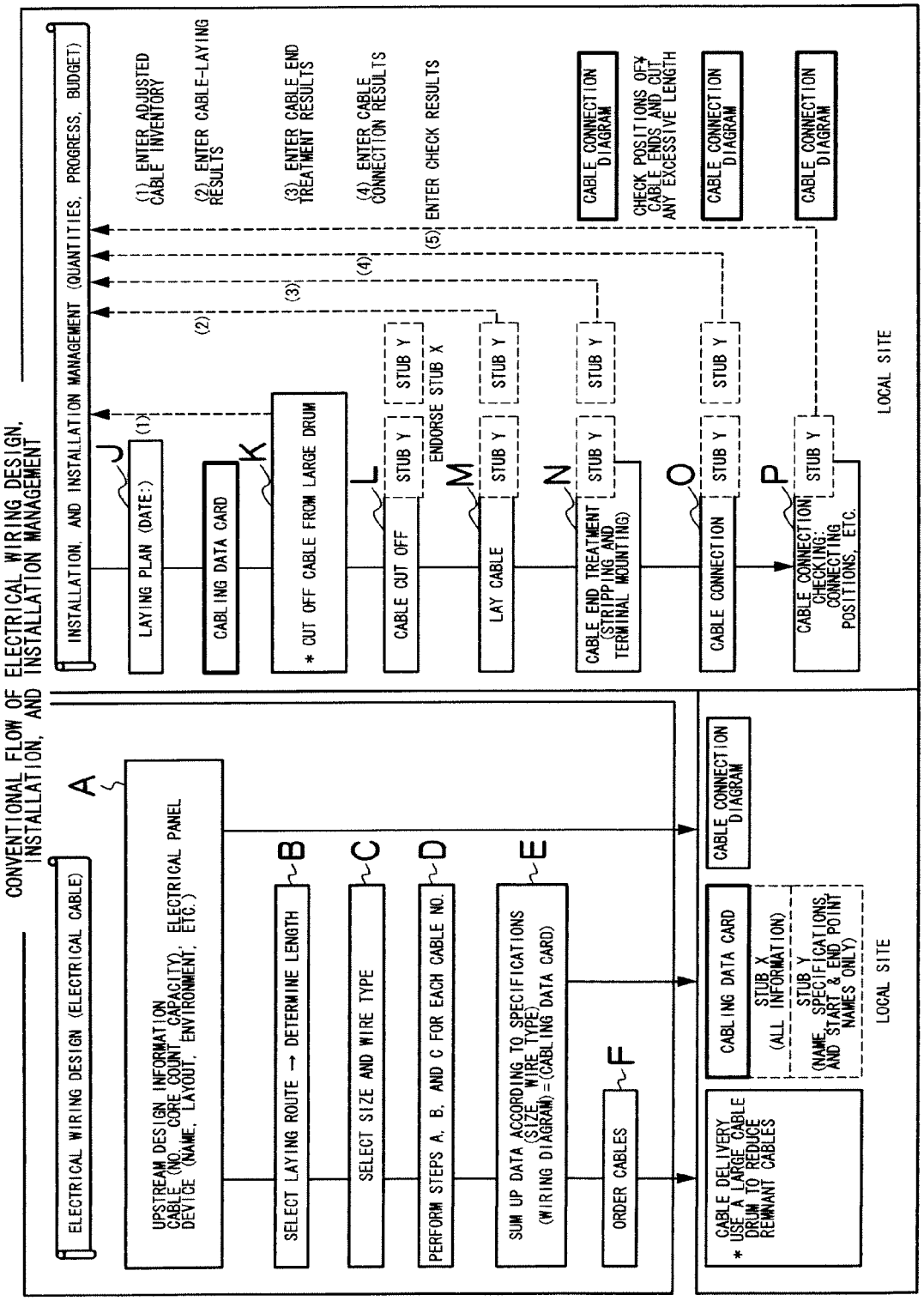
FIG. 14 is a diagram showing a flow of conventional cable design installation support and management.

FIG. 4 is a diagram showing a flow of cable design, installation, and management according to the present invention. Incidentally, in FIG. 4, steps identical to those in FIG. 14 are assigned the same step numbers as the corresponding steps in FIG. 14 which shows a conventional flow of cable design, installation, and management.

Figure 15:
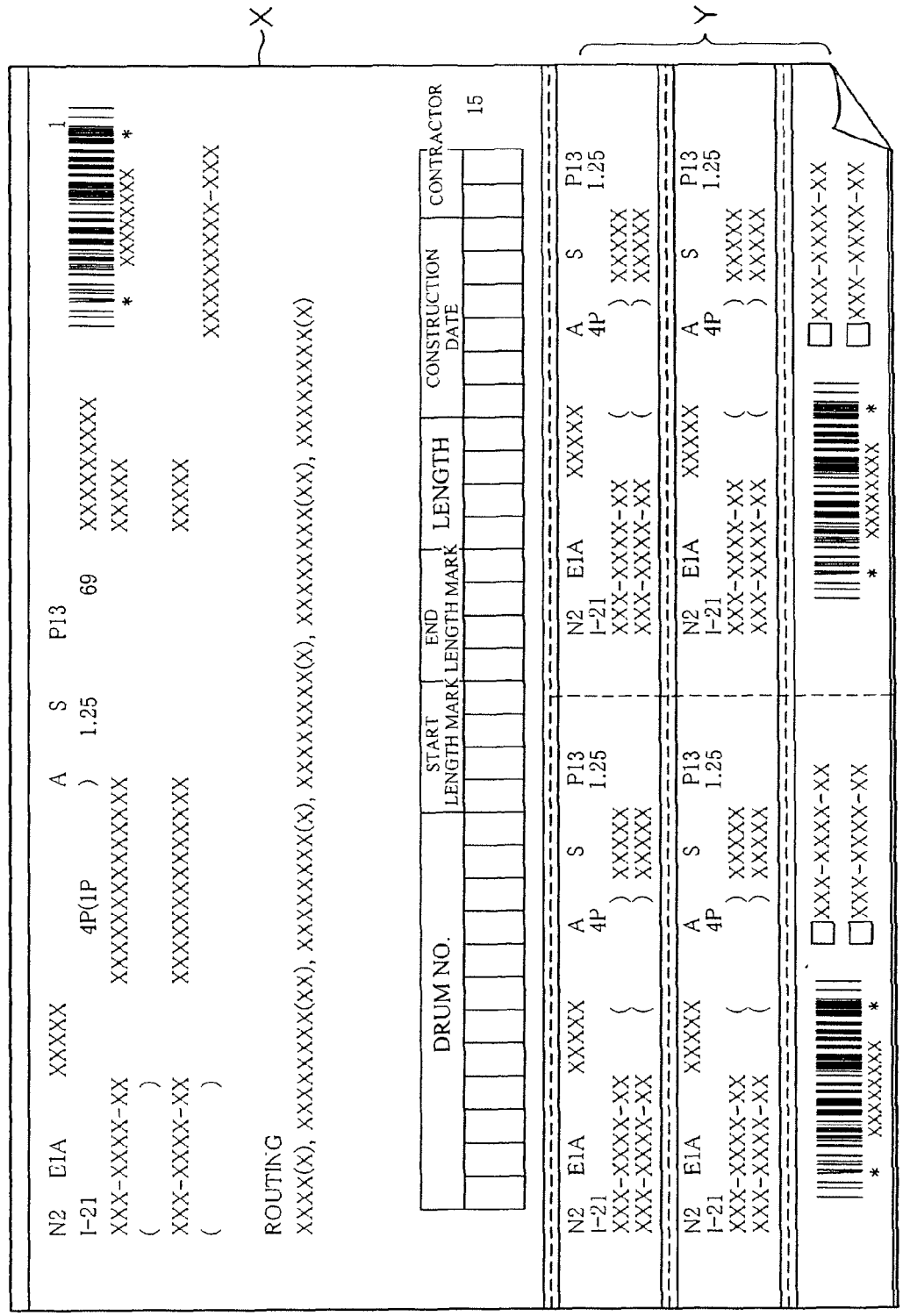
FIG. 15 is a diagram showing a conventional cabling data card.

First, instead of the conventional paper-based cabling data card (stub X and stub Y) shown in FIG. 15, a cabling data card (stub Y) embedded with an RFID tag is issued.

The operation information can be downloaded onto the PDA 50 or tablet PC 60 carried by the worker in each site from the work DB server 20 via a network.

In Step K, an RFID tag is scanned, thereby acquiring operation information for use to cut off a cable corresponding to the cable number from the cable drum. In Step L, stub Y embedded with an RFID tag is pasted to both ends of the cut cable.

In a cable laying site, the worker reads a cable ID from stub Y using the PDA 50 to acquire laying route information (Step M). The worker lays the cable along a laying route based on the laying route information.

In Step N, the worker treats cable ends (stripping and terminal mounting). The cable connection diagram needed for the cable end treatment is acquired by reading the cable ID from stub Y using the PDA 50.

Similarly, in a cable connection operation in Step O in which the worker connects the cable to a panel and terminal board and in a cable connection checkup operation in Step P, the worker acquires the cable connection diagram and check list by reading the cable ID from stubs Y using the tablet PC 60.

That is, the system according to the present invention eliminates the need for the conventional portion (stub X) in which all the information is printed as well as paper-based cable connection diagrams.

Also, results data of operations can be entered via the portable terminal or the like, eliminating the need for documents and the like used to enter results.

<Matching of RFID Manufacturing Numbers and Cable Information>

As shown in FIG. 5A, when the cable number of a cable is inputted in the printer 42 from the personal computer 40 installed in the local office, the printer 42 outputs two cabling data cards (hereinafter referred to as "RFID-tagged index labels") embedded with a RFID tag on which a unique cable ID (ID unique to the RFID) has been recorded.

As shown in FIG. 5B, the two RFID-tagged index labels 44 are attached to opposite ends of the cable, respectively (only one end is shown in FIG. 5B).

The ID unique to the RFID embedded in each RFID-tagged index label, for example, is a RFID manufacturing number assigned during manufacturing. The RFID tags embedded in the two RFID-tagged index labels issued for each cable contain different IDs.

The printer 42 prints the cable number on the RFID-tagged index labels and informs the personal computer 40 of the IDs (hereinafter referred to as "cable IDs") unique to the RFIDs embedded in the two RFID-tagged index labels on which the cable number is printed. Incidentally, the personal computer 40 may be equipped with a RFID reader to read the cable ID each time a RFID-tagged index label is printed out.

The personal computer 40 associates cable information (cable numbers) with the cable IDs contained in the RFID tags of the two RFID-tagged index labels printed out for the cable numbers and sends the resulting information to the work DB server 20.

Cable numbers are associated with cable IDs in this way to make it possible to acquire various information about the cables associated with the cable numbers and the like from the work DB server 20 by reading the cable IDs from the RFID tags as described later.

<Details of Operations Carried Out with Cable Installation Support and Management System>

FIG. 6 is a flowchart showing a flow of operations carried out with the cable installation support and management system according to the present invention. Details of the operations will be described with reference to FIGS. 7 to 13.

[Linking DB Server and PDA (Step S10)]

The work DB server 20 is connected with the PDAs 50 and tablet PCs 60 of workers via a wireless LAN and private lines. Operation information which supports operations on cables authorized for use and which are associated with cable IDs is downloaded onto the PDAs 50 and tablet PCs 60 from the work DB server 20.

Figure 7:
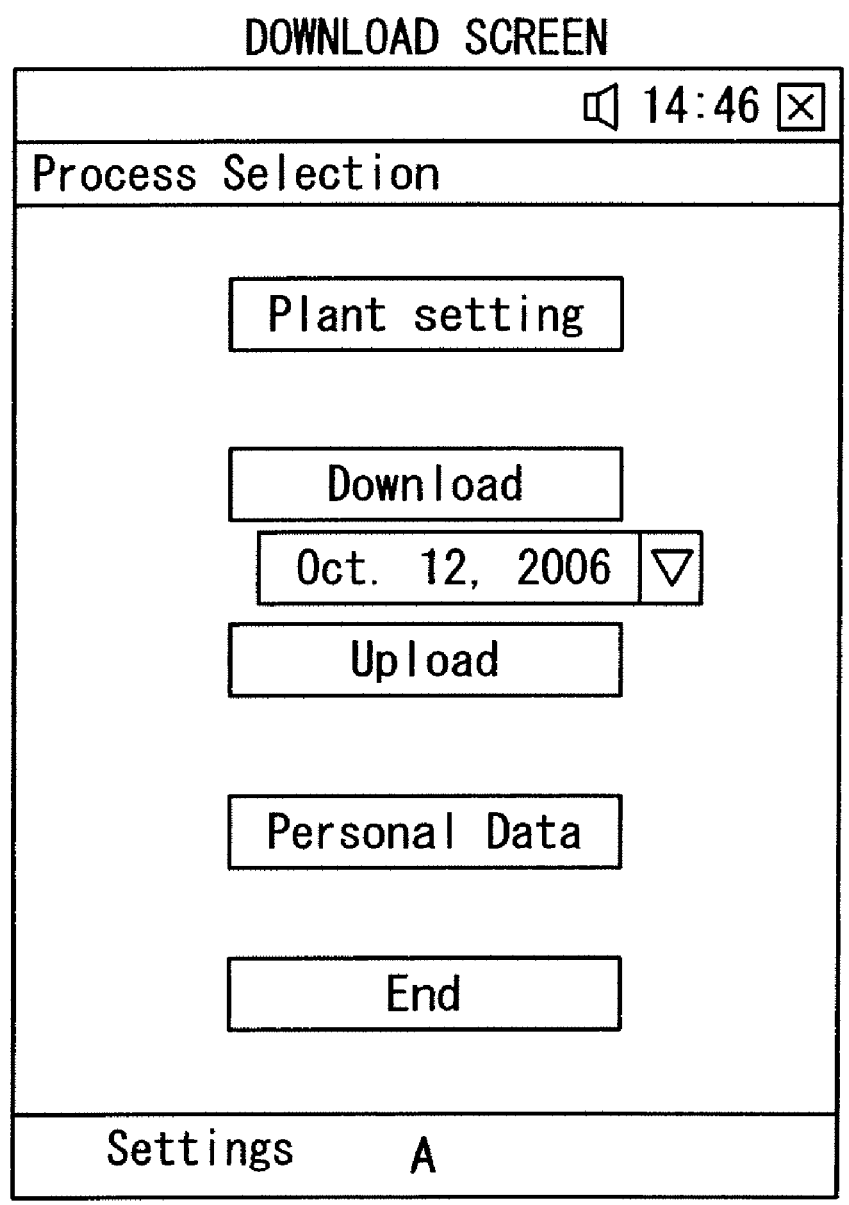
FIG. 7 is a diagram showing a Download screen displayed on a PDA.

FIG. 7 shows a Download screen displayed on the PDA 50. The worker brings up the Download screen on the display device of the PDA 50 as shown in the figure by starting up the software of the cable installation support and management system installed on the PDA 50 and selecting a Download menu item.

For downloading, the worker specifies a plant, enters a date, and enters his/her user ID in the PDA 50. Incidentally, the user ID is entered as the RFID tag embedded in an authentication card (such as a name plate) of the given worker is scanned by the RFID reader connected to the PDA 50.

When the worker presses a Download soft button, a download request is transmitted together with the plant name, date, and user ID to the work DB server 20 via the wireless LAN and private line. Based on the information managed by the installation management DB server 30, the work DB server 20 carries out an authentication check on the worker using the user ID. If it is determined that the worker has access privileges, the work DB server 20 searches for cables authorized by the design department for use using the date entered by the worker and transmits the operation information about any retrieved cable to the PDA 50. The PDA 50 stores the downloaded operation information in the internal storage device.

Incidentally, an Upload soft button is also displayed on the Download screen. When the worker presses the button, the operation results data stored in the PDA 50 is uploaded to the work DB server 20 and installation management DB server 30.

[Obtaining Operation Information (Step S20)]

Figure 8:
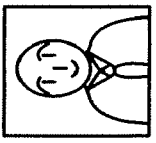
FIG. 8 is a diagram showing a PDA screen used to obtain operation information.

FIG. 8 shows a PDA's (50) screen used to obtain operation information. By setting either of a cable cutoff operation, cable-laying operation, cable end treatment operation, or cable connection operation, the worker displays an appropriate operation setting screen on the PDA 50. FIG. 8 shows a screen for the cable cutoff operation.

Next, the worker enters the user ID and cable ID in the PDA 50 and presses an OK button to obtain (read) operation information about the cable cutoff operation of the cable to be actually used out of the downloaded and stored list of cables authorized for use. The obtained operation information is displayed on the display device of the PDA 50, providing operation instructions and operation support to the worker.

To enter the user ID, the RFID tag embedded in the user's authentication card is scanned, as above, by the RFID reader. To enter the cable ID, the RFID tag embedded in the RFID-tagged index label 44 (see FIG. 5B) is scanned by the RFID reader.

The terminal manipulations used to enter operation information are common to the cable cutoff operation, cable-laying operation, cable end treatment operation, and cable connection operation, and are carried out prior to these operations.

[Cable Cutoff Operation (Step S30)]

FIGS. 9A and 9B show a Cable Cutoff Operation screen displayed on the PDA 50. The worker obtains the operation information about cable cutoff operation as described above and displays the Cable Cutoff Operation screen on the PDA 50.

The Cable Cutoff Operation screen shown in FIG. 9A displays cable information (Cable No., Design Length, Wire Type, Core Count, Spec. Code) used for a cable cutoff operation based on the obtained operation information. By referring to the cable information, the worker selects an appropriate cable drum around which a cable to be cut off is wound and cuts off a cable of the design length from the cable drum.

When the cutoff operation is finished, the worker displays a soft keyboard on the PDA 50 shown in FIG. 9B (showing character input image) and fills in input fields (Cable Drum No., Length, Length Marks (Start and End Length Marks), Cutoff Date) which represent results of the cutoff operation. A 2,000-m-long cable, for example, is wound around an unused cable drum and length marks are put on the cable at 1-m intervals. According to this embodiment, 215 is entered as a start length mark and 70 is entered as an end length mark. Thus, it can be seen that a cable with a length of 145 m (=215−70) is cut off from the cable drum and that length of the cable remaining on the cable drum is 70 m.

When the worker presses a Register button after filling in the input fields, entries of the Cutoff Operation input fields as well as the user ID, cable ID, and registration date are stored in the internal storage device of the PDA.

Also, the RFID-tagged index label 44 is pasted to both ends of the cable cut off as described above.

[Cable-Laying Operation (Step S40)]

FIGS. 10A and 10B show a Cable-laying Operation (tray route selection) screen displayed on the PDA 50. The worker selects Cable-laying Operation. The worker obtains the operation information about cable-laying operation by reading the cable ID from the RFID-tagged index labels 44 pasted to the ends of the cable, and the user ID from the authentication card using the RFID reader of the PDA 50, and thereby displays the Cable-laying Operation screen on the PDA 50.

The Cable-laying Operation screen shown in FIG. 10A displays cable information (Cable No., Design Length, Wire Type, Core Count, Spec. Code) used for the laying operation based on the obtained operation information. The Cable-laying Operation screen (screen on Next Page) shown in FIG. 10B (display example of wiring diagram) shows route information (e.g., a list of point numbers of cable trays (cable racks)) about the route on which the cable will be laid.

The worker lays the cable along the cable trays or cable racks in a housing by referring to the route information.

When the laying operation is finished, the worker presses a Register button on the Cable-laying Operation screen in FIG. 10A to store the laying operation information as well as the user ID, cable ID, and registration date in the internal storage device of the PDA.

[Cable End Treatment Operation (Step S50)]

FIGS. 11A and 11B show a PDA (50) screen used to obtain operation information about cable end treatment operation. The worker displays a Cable End Treatment Settings screen on the PDA 50, enters the user ID and cable ID, and specifies whether the cable end to be treated is on the start side or end side. Incidentally, in FIG. 11A, the cable end specified is on the start side.

Next, by pressing an OK button, the worker obtains operation information about cable end treatment operation on the start side of the cable to be actually used out of the downloaded and stored list of cables authorized for use.

The RFID-tagged index labels containing different cable IDs are pasted to the opposite ends of each cable, and by specifying the start side or end side, it is possible to identify whether the cable ID read from the RFID-tagged index label by the PDA 50 belongs to the start side or end side (associate each cable ID with start-side data and end-side data).

The PDA 50 displays a cable connection diagram (see FIG. 12) and the like based on the obtained operation information about cable end treatment. The worker performs a cable end treatment operation by referring to the cable connection diagram and the like displayed on the PDA 50.

The cable end treatment operation includes cable stripping and terminal mounting at cable ends as shown in FIG. 5B. By referring to the cable connection diagram and the like, it is possible to adjust strip length, core wire length, and the like as required.

When the cable end treatment operation is finished, the worker presses a Register button on the Cable End Treatment Settings screen in FIG. 11B to store the cable end treatment operation information as well as the user ID, cable ID, and registration date in the internal storage device of the PDA.

[Cable Connection Operation (Step S60)]

Figure 12:
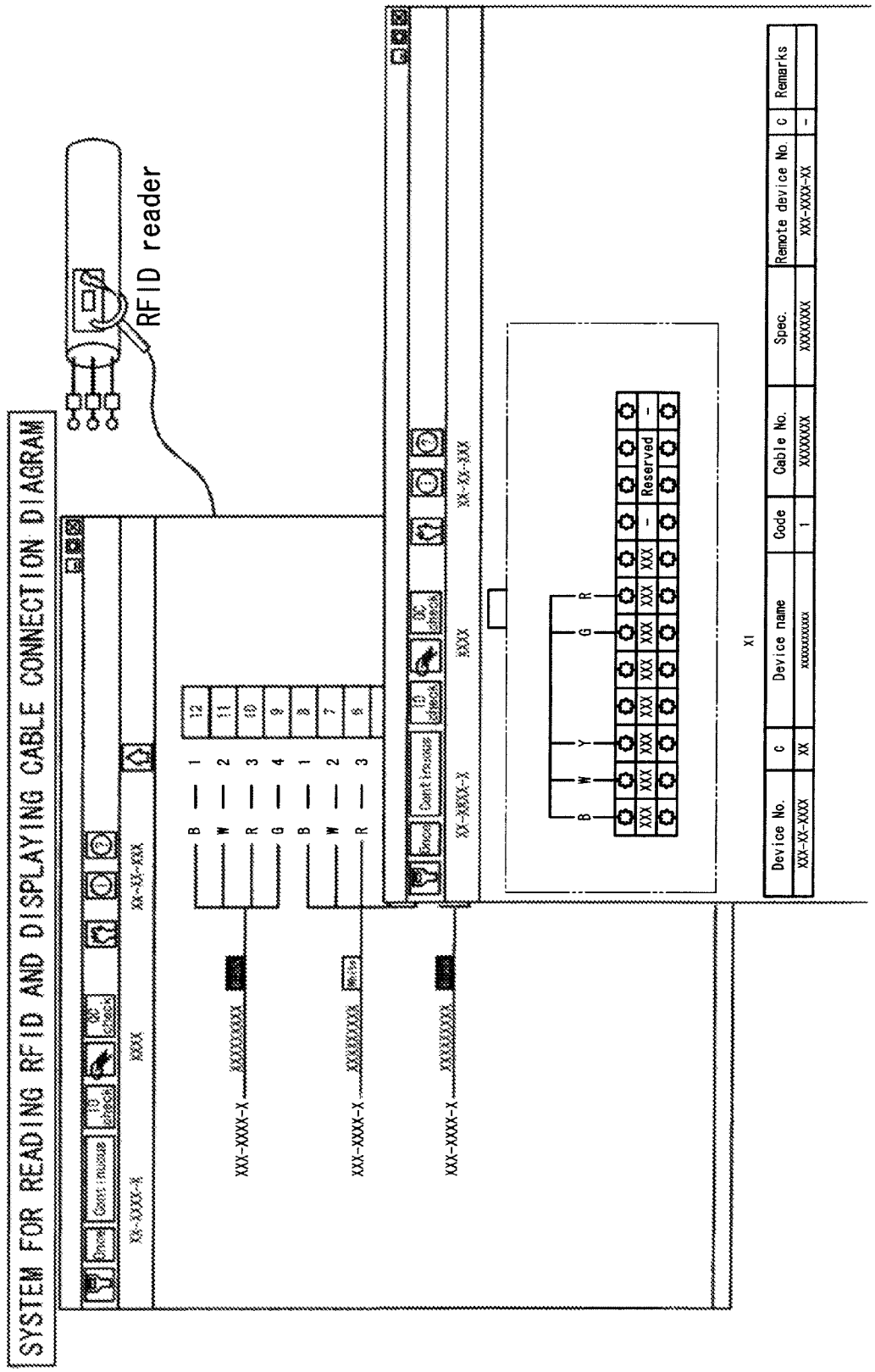
FIG. 12 is a diagram showing a Cable Connection Operation screen displayed on a tablet PC.

FIG. 12 shows a Cable Connection Operation screen displayed on the tablet PC 60. The worker selects Cable Connection Operation. The worker obtains the operation information about cable connection operation by reading the cable ID from the RFID-tagged index labels 44 pasted to the ends of the cable, and the user ID from the authentication card using the RFID reader of the tablet PC 60, and displays the Cable Connection diagram on the tablet PC 60 based on the operation information.

In the cable connection diagram in FIG. 12, "B," "W," "R," and "G" displayed for core wires of the cable represent colors (black, white, red, and green) of the core wires while numeric figures represent numbers written on the core wires. From the cable connection diagram displayed on the tablet PC 60, the worker can confirm which core wire to connect and to what position on the panel or terminal board, and can carry out the cable connection operation properly.

The reason why the worker uses the tablet PC 60 instead of the PDA 50 when carrying out the cable connection operation is that the tablet PC 60 has a larger screen, making it easier to view the cable connection diagram. Thus, the PDA 50 may be used instead of the tablet PC 60 when it is all right if the cable connection diagram is displayed on a small screen.

[QC Checking (Step S70)]

After the cable connection operation is finished, the same worker carries out QC (Quality Control) checking.

Figure 13:
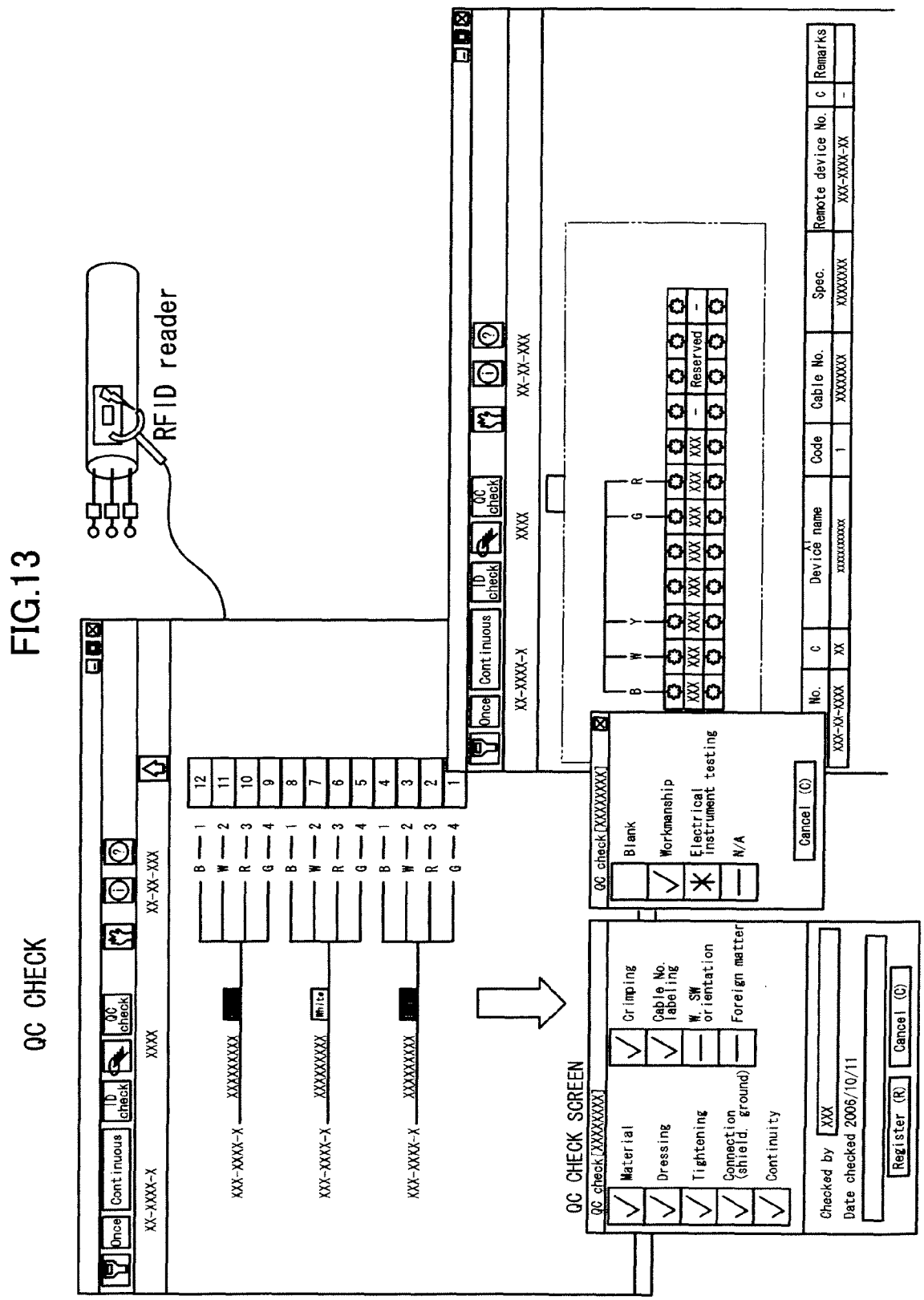
FIG. 13 is a diagram showing a Cable Connection Operation screen and QC Check screen displayed on the tablet PC during QC checking.

That is, when the worker clicks a QC Check button on a menu bar displayed at top of the Cable Connection Operation screen shown in FIG. 12, a QC Check screen pops up as shown in FIG. 13.

The cable connection worker (checker) performs QC checking by marking check boxes of items to be checked on the QC Check screen. When the QC checking is finished, the checker presses a Register button at top of the QC Check screen to store the cable connection operation information and QC checking results as well as the user ID, cable ID, and registration date in the internal storage device of the PDA.

As described with reference to FIG. 7, when the worker presses the Upload soft button on the Download screen, the operation results data (operation information about the various operations, the user ID, cable ID, registration date, and QC checking results) stored in the storage devices of the PDA 50 and tablet PC 60 is uploaded to the work DB server 20 and installation management DB server 30 for subsequent use in the DB servers.

In departments and local sites, the operation results data makes it possible to check progress of operations, remaining cable material after cutoff, and inventory in real time based on conditions of cable-laying, cable end treatment, and connection operations in-process as well as to keep track of work performance of individual employees.

Other Embodiments

Although in the above embodiment, the portable terminals such as the PDA have wireless LAN communications capabilities, this is not restrictive and necessary information may be downloaded or uploaded by connecting via a cable or cradle to a device connected with a network.

Also, although in the above embodiment, the operation information about the cables authorized for use are downloaded in bathes and stored in the storage device of a portable terminal and necessary information is read out of the storage device in response to selection of an operation or input of a cable ID, this is not restrictive and the DB servers may be informed of the user ID, cable ID, and selected operation on an operation by operation basis and the operation information needed for the operation may be downloaded from the DB servers on an operation by operation basis. Incidentally, the work DB server and installation management DB server may be integrated.

Furthermore, although in the above embodiment, RFID-tagged index labels are pasted to cable ends, cabling data cards on which a barcode representing a unique cable ID is printed may be pasted to the cable ends. In that case, the portable terminals such as the PDA need to be equipped with a barcode reader.

What is claimed is:

1. A cable installation support and management system, comprising:
   a portable terminal carried by a worker and a server which exchanges necessary information with the portable terminal via a network, the cable installation support and management system being used when laying a cable along a predetermined route in a facility, where a cabling data card containing cable identification information unique to the cable is attached to an end of the cable, and when connecting the end of the cable to a panel and a terminal board, wherein:
   the portable terminal comprises:
   a reading device which reads the cable identification information out of the cabling data card attached to the end of the cable,
   a first storage device which downloads and stores operation information which, being associated in advance with cable identification information and provided by the server, supports operations on cables authorized for use,
   an operation information acquiring device which acquires, from the first storage device based on the cable identification information read by the reading device, operation information about the cable corresponding to the cable identification information, said operation information including a cable connection diagram, and
   a display device which displays the operation information acquired by the operation information acquiring device; and
   the server comprises:
   a second storage device which stores operation information which supports operations on cables to be laid in the facility by associating the operation information with the cable identification information about the cables,
   an extraction device which extracts operation information about a cable authorized and available for use from the second storage device in response to a download request from the portable terminal,
   an operation information providing device which provides the operation information extracted by the extraction device to the portable terminal together with the cable identification information, and
   wherein the cabling data card is attached to each of opposite ends of the cable, where the cabling data cards attached to the opposite ends contain different cable identification information to at least distinguish opposite ends from each other.

2. The cable installation support and management system according to claim 1, wherein:
   an RFID tag is embedded in the cabling data card or a barcode is printed on the cabling data card; and
   the reading device of the portable terminal is a RFID tag reader or a barcode reader.

3. The cable installation support and management system according to claim 1, wherein the portable terminal further comprises an input device for use by the worker to enter authentication information in order to obtain access permission to at least the server.

4. The cable installation support and management system according to claim 3, wherein the authentication information about the worker is recorded in an RFID tag embedded in an authentication card of the given worker, and the input device is a RFID tag reader.

5. The cable installation support and management system according to claim 3, wherein the portable terminal comprises a registration device used to register an end of operation corresponding to the operation information, and uploads the cable identification information, a registration date/time, and the authentication information about the worker to the server when the end of operation is registered via the registration device or when an upload command is entered.

6. The cable installation support and management system according to claim 1, wherein the operation information includes information about at least one of a cable cutoff operation of cutting off a cable of designed length from a cable drum, a cable-laying operation of laying the cut cable along a designed route, cable end treatment operation of treating cable ends at both ends of the laid cable to make the cable ends connectable, a cable connection operation of connecting the treated cable ends to the panel and the terminal board, and a checking operation of checking the connected cable.

7. The cable installation support and management system according to claim 6, wherein the operation information about the cable cutoff operation includes information for identification of the cable and information about design length of the cable.

8. The cable installation support and management system according to claim 6, wherein the operation information about the cable-laying operation includes route information for laying the cable.

9. The cable installation support and management system according to claim 6, wherein the operation information about the checking operation includes a check list.

10. A cable installation support and management system comprising:

a portable terminal carried by a worker and a server which exchanges necessary information with the portable terminal via a network, the cable installation support and management system being used when laying a cable along a predetermined route in a facility, where a cabling data card containing cable identification information unique to the cable is attached to an end of the cable, and when connecting the end of the cable to a panel and a terminal board, wherein:

the portable terminal comprises:

a reading device which reads the cable identification information out of the cabling data card attached to the cable, an operation information acquiring device which acquires, from the server based on the cable identification information read by the reading device, operation information which supports operations on the cable corresponding to the cable identification information, said operation information including a cable connection diagram, and a display device which displays the operation information acquired by the operation information acquiring device; and the server comprises:

a storage device which stores operation information which supports operations on cables to be laid in the facility by associating the operation information with the cable identification information about the cables, an extraction device which extracts, from the storage device based on the cable identification information received from the portable terminal, operation information corresponding to the cable identification information, an operation information providing device which provides the operation information extracted by the extraction device to the portable terminal, and wherein the cabling data card is attached to each of opposite ends of the cable--where the cabling data cards attached to the opposite ends contain different cable identification information to at least distinguish opposite ends from each other.

11. The cable installation support and management system according to claim 10, wherein:

an RFID tag is embedded in the cabling data card or a barcode is printed on the cabling data card; and the reading device of the portable terminal is a RFID tag reader or a barcode reader.

12. The cable installation support and management system according to claim 10, wherein the portable terminal further comprises an input device for use by the worker to enter authentication information in order to obtain access permission to at least the server.

13. The cable installation support and management system according to claim 12, wherein the authentication information about the worker is recorded in an RFID tag embedded in an authentication card of the given worker, and the input device is a RFID tag reader.

14. The cable installation support and management system according to claim 12, wherein the portable terminal comprises a registration device used to register an end of operation corresponding to the operation information, and uploads the cable identification information, a registration date/time, and the authentication information about the worker to the server when the end of operation is registered via the registration device or when an upload command is entered.

15. The cable installation support and management system according to claim 10, wherein the operation information includes information about at least one of a cable cutoff operation of cutting off a cable of designed length from a cable drum, a cable-laying operation of laying the cut cable along a designed route, cable end treatment operation of treating cable ends at both ends of the laid cable to make the cable ends connectable, a cable connection operation of connecting the treated cable ends to the panel and the terminal board, and a checking operation of checking the connected cable.

16. The cable installation support and management system according to claim 15, wherein the operation information about the cable cutoff operation includes information for identification of the cable and information about design length of the cable.

17. The cable installation support and management system according to claim 15, wherein the operation information about the cable-laying operation includes route information for laying the cable.

18. The cable installation support and management system according to claim 15, wherein the operation information about the checking operation includes a check list.

* * * * *